Oct. 1, 1957 — S. B. LYON — 2,808,286
CEMENT BLOCK HANDLING TOOL
Filed Jan. 3, 1957

INVENTOR
SHERLEY B. LYON.
BY Gustave Miller
ATTORNEY

United States Patent Office 2,808,286
Patented Oct. 1, 1957

2,808,286

CEMENT BLOCK HANDLING TOOL

Sherley B. Lyon, Lexington, Ky.

Application January 3, 1957, Serial No. 632,284

6 Claims. (Cl. 294—62)

This invention relates to a handling tool, and it particularly relates to a tool for lifting and carrying cement building blocks.

As is well known, cement building blocks include one or more core openings and when carrying such blocks, it is the general practice to insert a frictional gripping device into such openings until it is wedged tight therein; after which the block may be lifted and carried. However, all previous tools of this type have been subject to various disadvantages. For example, once such prior type tools were wedged in place, it was often difficult to remove them without damaging the block. Such damages, usually in the form of chipping, caused areas of weakness which, later on, after a period of use, undermined the strength of the entire block.

In addition to the aforementioned shortcomings of the prior type of block handling tools, they were generally not equally adaptable to blocks of different sizes and dimensions. Furthermore, many of these prior devices were not capable of adequately supporting the blocks.

It is, therefore, one object of the present invention to provide a lifting and carrying tool which is adapted to handle the blocks without danger of damage to the blocks.

Another object of the present invention is to provide a lifting and carrying tool which is equally adapted to handle blocks of varying sizes and dimensions.

Another object of the present invention is to provide a lifting and carrying tool which is simple in construction and operation.

Other objects of the present invention are to provide an improved lifting and carrying tool, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
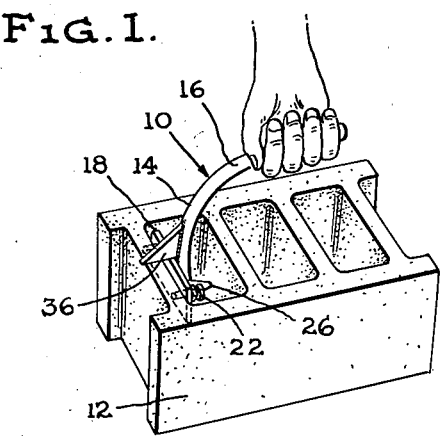
Fig. 1 is a perspective view of a single block carrier embodying the present invention, shown in use.

Referring now in greater detail to the drawing wherein similar reference characters refer to similar parts, there is shown, in Fig. 1, a tool, generally designated 10, which is inserted in the core opening of a cement block 12, the tool being in operative, carrying position.

Figure 3:
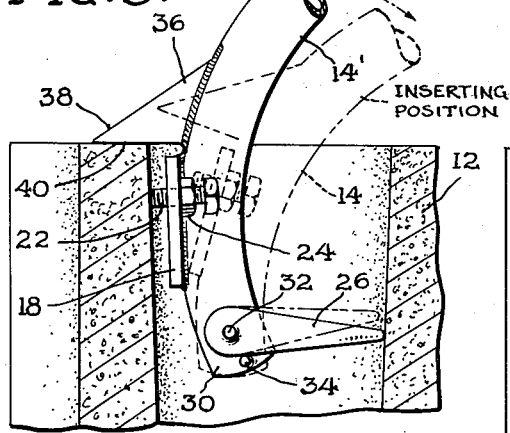
Fig. 3 is a fragmentary side elevational view of the single block carrier of Fig. 1.
Figure 5:
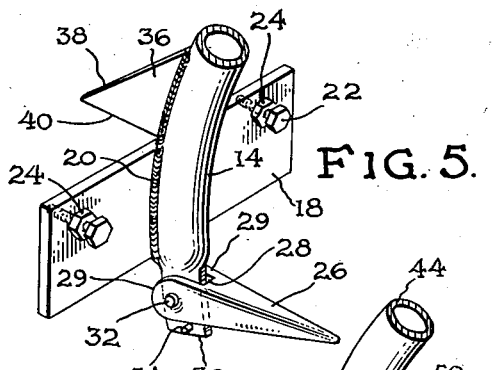
Fig. 5 is a rear perspective view of the device of Figs. 1 and 3.

The tool 10, as best shown in Figs. 3 and 5, comprises a tubular rod 14, arcuately shaped to provide a handle portion 16 at one end, as shown in Fig. 1, and to provide a gripping assembly at its opposite end. This holding assembly includes a generally rectangular plate 18 which is brazed, welded, or otherwise secured to the rod 14, at the median portion of the plate, as at 20. This plate 18, which will be referred to as an "abutment plate" is provided at each of its opposite ends with an adjusting screw 22. These screws each extend through a lock nut 24 for locking adjustment; the end of each screw 22 serving as an abutment device for frictional engagement with the walls of the core opening.

At the lower end of the rod 14, just below the lower edge of the plate 18, there is provided a pointed dog member 26. This dog member 26 is slotted at its blunt end, such slot being shown at 28, to form a fork portion 29. This fork portion 29 embraces a flattened end portion 30 on the rod 14 and is pivotally connected thereto by a pivot pin 32. A lug 34 extends laterally from the flattened end portion 30 to act as a limit stop for the dog member 26. The stop lug 34 is so positioned that it holds the dog member 26 in substanitally perpendicular position relative to the lower portion of the rod 14.

Intermediate the ends of the rod 14, but close to the upper edge of the plate 18, there is provided a wedge-shaped depth gauge member 36. This depth gauge member 36 has an inclined upper edge 38 and a straight bottom edge 40. By such construction, the gauge 36 member not only serves as a fulcrum for the tool 10 but also, by means of its straight bottom edge 40, acts as a limit stop to prevent further penetration of the tool 10.

In operation, the screws 22 are adjusted to a predetermined extent, depending on the size of the core opening, the tool 10 is then inserted at an inclined angle, as indicated in dotted outline 14' in Fig. 3, and is then pulled up into the position indicated in full line in Fig. 3. In such position, the screws 22 wedge against one wall while the point of the dog member 26 wedges against the opposite wall of the core opening. In such position, the tool 10 is tightly engaged and may be used to lift and carry the cement block.

When it is desired to withdraw the tool, it is merely necessary to pull back on the handle portion 14 of the tool 10 to the position at 14. This pivots the rod around the pivot pin 32, thereby easily releasing the tool 10 from its wedged position. It can then be easily and quickly withdrawn.

Figure 2:
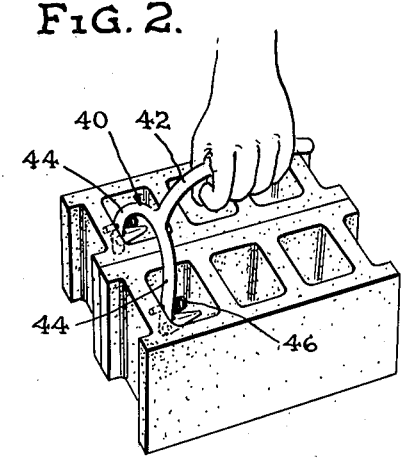
Fig. 2 is a perspective view of a double block carrier shown in use.
Figure 6:
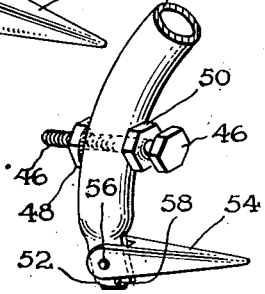
Fig. 6 is a fragmentary perspective view of one leg of the double armed carrier of Fig. 2.

In Fig. 2, there is shown a similar tool 40 except that it comprises a handle portion 42 integral with oppositely curved legs 44 extending laterally therefrom. In this embodiment, as best shown in Fig. 6, instead of an abutment plate, each leg 44 is individually provided with an adjustable screw 46 extending through the leg and through a nut 48 brazed or otherwise secured to the leg 44. A lock nut 50 holds the screw 46 in adjusted position.

Each leg 44 is provided with a flattened end portion 52 having a pointed dog member 54 pivotally connected thereto by a pivot pin 56. A lug 58 acts as a limit stop for the dog member 54 in similar manner as the construction shown in Figs. 3 and 5. Each screw 46 and dog member 54 acts as an independent wedging assembly.

Figure 4:
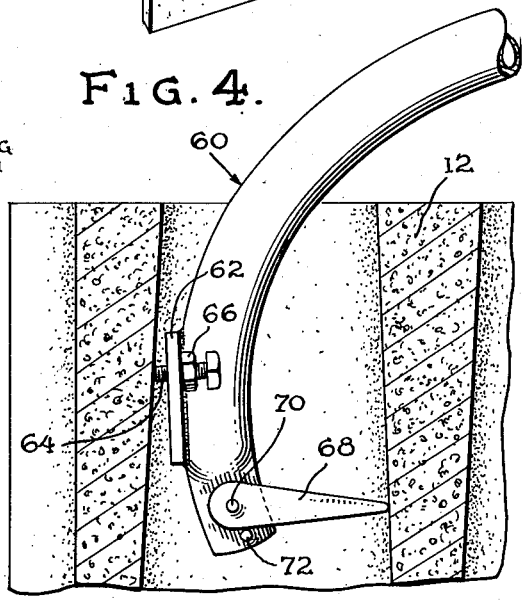
Fig. 4 is a fragmentary view, similar to Fig. 3, but modified to delete the gauge member.

In Fig. 4, there is shown a tool 60 similar in every respect to that shown in Figs. 1, 3 and 5 in that it includes a plate 62, screws 64, nuts 66, dog member 68 on pivot pin 70, and stop lug 72. It differs from the prior embodiment only in that the depth gauge member has been eliminated. This embodiment does not provide the fulcrum function served by the depth gauge member nor does it have the additional support afforded by that member; however, it permits the tool 60 to be inserted into the core opening as deeply as desired. It also permits the tool 60 to be inserted through the narrower bottom portion of the opening. This is indicated in Fig. 4 where it is actually the narrower bottom portion of the core which is shown uppermost.

Figure 7:
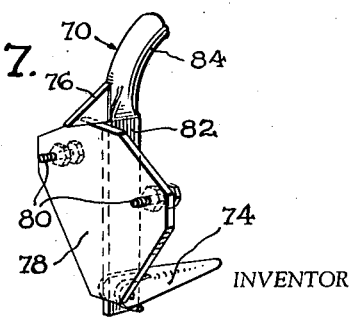
Fig. 7 is a perspective view of another embodiment of the invention.

In Fig. 7 there is shown a modified form 70 of the invention wherein the same dog member, such as shown at 74, and the same type of depth gauge member, such as shown at 76, is used as in the device shown in Figs. 1, 3, and 5. However, the plate 78 is generally elongated in the vertical direction and polygonal in shape. Screws 80, similar to screws 22, are provided at opposite side of the upper portion of the plate and serve the same function as abutment members.

The plate 78 is connected along its vertically median portion to an elongated flattened portion 82 of the rod 84; this connection being by means of brazing, welding, or the like.

The elongated and broadened plate 78 is especially useful for heavier or larger type cement blocks because it distributes the abutment friction of the screws over a larger area and, therefore, each portion of the plate is enabled to bear a relatively smaller load.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A lifting and carrying device comprising a rod having a handle portion at one end and a gripping assembly at the opposite end, said rod being arcuately curved between said handle portion and said gripping assembly, said gripping assembly comprising adjustable screw means to contact one wall of the core opening of a cement block to be lifted and carried and a pivoted dog member below the screw means to contact the opposite wall of said core opening, there being stop means on said rod to hold said dog member in operative position wherein said dog member extends from said rod in a direction substantially opposite to said screw means.

2. The device of claim 1 wherein said gripping assembly also includes a plate connected to said rod and extending laterally on each side thereof, and wherein said screw means comprises a pair of screws, one at each side of said plate, which threadedly extend through said plate and are held in adjusted positions by corresponding lock nuts.

3. The device of claim 1 wherein said gripping assembly also includes a pair of oppositely positioned legs integral with said handle portion and extending laterally thereof in opposite directions to each other, each of said legs being provided with a screw threadedly extending through each of said legs adjacent the free end portion thereof, said screws forming the aforesaid adjustable screw means, and said dog member is pivotally positioned adjacent but below the screw on each leg.

4. The device of claim 1 wherein a depth gauge is provided on said rod between said gripping assembly and said handle portion, said depth gauge being adapted to abut against said cement block upon a predetermined insertion of said device into the core opening.

5. A lifting and carrying device comprising an arcuately curved rod, a handle portion at one end of said rod, and a gripping assembly at the opposite end of said rod, said gripping assembly comprising a plate secured to one side of said rod and extending laterally from said rod in opposite directions, a pair of screws threadedly extending through said plate, one screw being positioned in each laterally extending portion of the plate, and a dog member pivoted on said rod below said plate, said dog member being arranged to pivot into a position wherein it extends in a direction opposite to that of said screws, and a stop means on said rod below said pivoted dog member to retain said dog member in said position whereby the screws engage one wall and the dog member engages an opposite wall of an opening in an object to be carried.

6. The device of claim 5 wherein a depth gauge is provided on said rod between said handle portion and said plate.

No references cited.